(No Model.)
H. E. DAVIDSON, Dec'd.
A. B. & E. B. Davidson, Executrixes.
JUICE EXTRACTOR.
No. 455,938. Patented July 14, 1891.
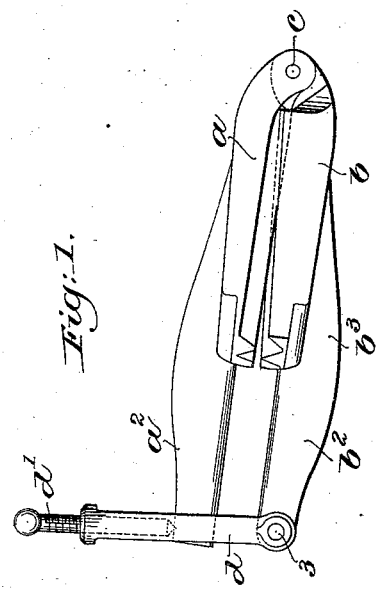
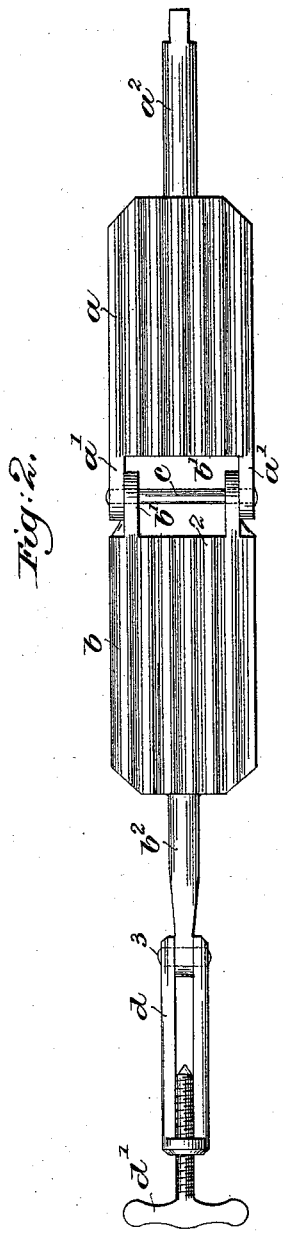
Witnesses.
Inventor.
Alice B. Davidson,
Edith B. Davidson,
Executors of will of Herman E. Davidson,
by Lemby Gregory. Attys.

UNITED STATES PATENT OFFICE.

ALICE B. DAVIDSON AND EDITH B. DAVIDSON, EXECUTRIXES OF HERMAN E. DAVIDSON, DECEASED, OF NORTHEAST HARBOR, MAINE.

JUICE-EXTRACTOR.

SPECIFICATION forming part of Letters Patent No. 455,938, dated July 14, 1891.

Application filed November 24, 1890. Serial No. 372,488. (No model.)

*To all whom it may concern:*

Be it known that HERMAN E. DAVIDSON, deceased, late of Northeast Harbor, State of Maine, did invent an Improvement in Juice-Extractors, of which the following is a specification.

Beef-juice or juice expressed from beef slightly cooked is one of the greatest possible tonics, as well as foods for invalids; but such juice is not readily procurable, and physicians resort to beef-essences, which, however, fail in furnishing the same nourishment.

The object of this invention is the production of a serviceable juice-extractor which may be readily operated and effectually so in squeezing all the juice out of the meat.

The improved extractor consists, essentially, of two corrugated jaws or platens hinged together, preferably at one end, each jaw being provided with lever-like arms, with which is combined a pressure-screw, the juice squeezed from the meat running along the bottom of the flutes or guideways into a suitable receptacle.

Figure 1 shows the extractor substantially closed, and Fig. 2 shows the same fully open.

The extractor consists, essentially, of two jaws or platens $a\,b$, having ears $a'\,b'$, through which is extended a pivot $c$. The jaw $a$ has a lever-like extension $a^2$, and the jaw $b$ a lever-like extension $b^2$, and preferably the extension $b^2$ is of such shape at its under side, as at $b^3$, that when the extractor is set down upon a table or board the jaws or platens will be inclined, as best shown in Fig. 1. The inner faces of the jaws are longitudinally corrugated, and the corrugations are of such depth and width that the juices squeezed from the beef will readily follow along the bottoms of the said grooves and be discharged from the lower ends of the same over the edge 2. The lever $b^2$ has pivoted upon it at 3 a loop or buckle $d$, provided with a strong screw $d'$ to act at its end on the lever $a^2$, the buckle and screw making a powerful clamp by which the jaws may be brought powerfully together on the meat or material placed between them.

In use the extractor may be set into a pan or be laid on a shelf or table, with the delivery ends of the jaws projecting sufficiently to enable a bowl to be held below to catch the juice.

Instead of the screw, any other novel equivalent device may be used by which to force the jaws together.

The device is very simple, may be easily used, and may be readily cleansed.

Prior to this invention it has been attempted to "tender" meat by squeezing it between jaws having pyramidal projections or points, as well as knives or blades, and in some instances jaws have been provided with holes to permit the escape of juices; but the employment of holes is very unsatisfactory, not only because the holes at once clog and thereafter prevent the passage of juices, but such holes become stopped and have to be cleaned out.

By making the jaws without holes and with straight surfaces they may be quickly and thoroughly cleansed.

It will be noticed that the corrugations or flutes are dull and substantially deep, so that when the beef is compressed between the jaws the juice will be expressed without being mixed with the fiber of the beef, so that the juice is free from pulp.

What is claimed is—

The herein-described juice-extractor, consisting of the two pivoted jaws $a\,b$, having upon their inner faces longitudinal dull or coarse flutes to form grooves, and projections to fit one into the other, and the attached levers, and a clamp pivoted to the outer end of one lever to act on the other of said levers to close the said jaws, one of said levers being shaped, as at $b^3$, to form an inclined bearing for the jaws when brought together, to operate substantially as described.

In testimony whereof we, ALICE B. DAVIDSON and EDITH B. DAVIDSON, executrixes of the last will and testament of HERMAN E. DAVIDSON, deceased, have signed our names to this specification in the presence of two subscribing witnesses.

ALICE B. DAVIDSON,
EDITH B. DAVIDSON,
*Executrixes.*

Witnesses:
A. S. WIEGAND,
AUGUSTA E. DEAN.